United States Patent
Hersman et al.

(10) Patent No.: US 9,673,588 B1
(45) Date of Patent: Jun. 6, 2017

(54) TECHNIQUES AND APPARATUS FOR MANAGING LASING GAS CONCENTRATIONS

(71) Applicant: Xemed LLC, Durham, NH (US)

(72) Inventors: F. William Hersman, Durham, NH (US); David W. Watt, Exeter, NH (US)

(73) Assignee: University of New Hampshire, Durham, NH (US)

( * ) Notice: Subject to any disclaimer, the term of this patent is extended or adjusted under 35 U.S.C. 154(b) by 1051 days.

(21) Appl. No.: 14/063,736

(22) Filed: Oct. 25, 2013

Related U.S. Application Data

(60) Provisional application No. 61/730,443, filed on Nov. 27, 2012, provisional application No. 61/718,909, filed on Oct. 26, 2012.

(51) Int. Cl.
*H01S 3/036* (2006.01)
*H01S 3/032* (2006.01)
*H01S 3/227* (2006.01)
*H01S 3/041* (2006.01)
*H01S 3/04* (2006.01)
(Continued)

(52) U.S. Cl.
CPC .............. *H01S 3/036* (2013.01); *H01S 3/032* (2013.01); *H01S 3/041* (2013.01); *H01S 3/0405* (2013.01); *H01S 3/0941* (2013.01); *H01S 3/0943* (2013.01); *H01S 3/227* (2013.01)

(58) Field of Classification Search
CPC ........ H01S 3/036; H01S 3/0941; H01S 3/032; H01S 3/041; H01S 3/227; H01S 3/0943; H01S 3/0405
See application file for complete search history.

(56) References Cited

U.S. PATENT DOCUMENTS

| | | | |
|---|---|---|---|
| 3,706,050 A | 12/1972 | Cason | |
| 2004/0125850 A1* | 7/2004 | Hayashikawa | H01S 3/041 372/85 |

(Continued)

OTHER PUBLICATIONS

A.V. Bogachev et al., "Diode-pumped caesium vapour laser with closed-cycle laser-active medium circulation," IOPScience 2012, Quantum Electronics vol. 42, No. 2, pp. 95-98.

*Primary Examiner* — Xinning Niu
(74) *Attorney, Agent, or Firm* — Finch & Maloney PLLC

(57) ABSTRACT

Techniques and architecture are disclosed for managing alkali vapor concentration in a lasing gas at non-condensing levels. In some instances, the disclosed techniques/architecture can be used to control and/or stabilize the concentration of alkali vapor in a lasing gas volume to any desired fraction of its saturation value under dynamically changing thermal loads. In some such instances, the concentration of alkali vapor in a given lasing gas volume can be maintained at a value which is sufficiently far from the saturation point to prevent or otherwise reduce condensation of the alkali vapor, for example, upon accelerating the lasing gas through a pressure drop into an optical pumping cavity of an alkali vapor laser system (e.g., such as a diode-pumped alkali laser, or DPAL, system). In some instances, the disclosed techniques/architecture can be used to establish a temperature gradient and/or an alkali vapor concentration gradient in the flowing lasing gas volume.

19 Claims, 3 Drawing Sheets

(51) Int. Cl.
    *H01S 3/0941*    (2006.01)
    *H01S 3/0943*    (2006.01)

(56) References Cited

U.S. PATENT DOCUMENTS

| | | | |
|---|---|---|---|
| 2009/0022201 A1* | 1/2009 | Krupke | H01S 3/031 372/75 |
| 2012/0087092 A1* | 4/2012 | Huber | F28D 15/00 361/701 |
| 2014/0023100 A1 | 1/2014 | Zweiback et al. | |
| 2014/0133514 A1 | 5/2014 | Krupke et al. | |

* cited by examiner

TECHNIQUES AND APPARATUS FOR MANAGING LASING GAS CONCENTRATIONS

CROSS-REFERENCE TO RELATED APPLICATIONS

This Application claims the benefit of U.S. Provisional Patent Application No. 61/730,443, filed on Nov. 27, 2012, and U.S. Provisional Patent Application No. 61/718,909, filed on Oct. 26, 2012, each of which is herein incorporated by reference in its entirety.

FIELD OF THE DISCLOSURE

This disclosure relates to laser systems and more particularly to flowing gas amplifier laser systems.

BACKGROUND

Laser systems involve a number of non-trivial challenges, and laser systems which utilize gaseous lasing media have faced particular complications, such as those with respect to providing stable concentrations of vapor within the gaseous lasing media.

SUMMARY

One example embodiment of the present invention provides a system including an alkali vapor laser system including an optical pumping cavity and a first circulation loop configured to circulate a lasing gas volumetric flow for use in the alkali vapor laser system. The first circulation loop includes a first heat exchanger thermally coupled with a first thermal reservoir, a first circulator fluidly coupled with the first heat exchanger, and an alkali vapor concentration management sub-system fluidly coupled with the first circulator and with the optical pumping cavity. The alkali vapor concentration management sub-system includes a first flow path configured to receive a first volumetric sub-flow of the lasing gas volumetric flow and, during transit of the first volumetric sub-flow therethrough, establish a temperature of that first volumetric sub-flow and an alkali vapor concentration in the first volumetric sub-flow at an alkali saturation density corresponding to that temperature, and a second flow path configured to receive a second volumetric sub-flow of the lasing gas volumetric flow and, during transit of the second volumetric sub-flow therethrough, maintain the second volumetric sub-flow at a temperature that is higher than the temperature of the first volumetric sub-flow. In some cases, the second flow path includes a second heat exchanger thermally coupled with the first thermal reservoir. In some cases, the first flow path includes an alkali vapor saturator comprising a saturating element having a quantity of liquid alkali metal disposed therein, the saturating element thermally coupled with a second thermal reservoir. In some such cases, the saturating element includes a plurality of indentations and/or corrugations. In some such instances, the quantity of liquid alkali metal is distributed discontinuously in the plurality of indentations and/or corrugations of the saturating element. In some of the aforementioned cases, the quantity of liquid alkali metal is distributed as a plurality of droplets within the saturating element. In some of the aforementioned cases, the quantity of liquid alkali metal at least partially wets an interior surface of the saturating element. In some of the aforementioned cases, the saturating element comprises at least one of stainless steel and/or glass. In some of the aforementioned cases, the saturating element comprises a helical, tubular coil. In some of the aforementioned cases, the liquid alkali metal comprises at least one of rubidium (Rb), cesium (Cs), and/or potassium (K). In some of the aforementioned cases, the alkali vapor saturator is decoupled from an operational phase of the alkali vapor laser system, the operational phase comprising at least one of system warm-up, a non-lasing ready state, lasing operation, and/or system cool-down. In any of the aforementioned cases, the first circulation loop further includes a recombination point at which the first volumetric sub-flow and the second volumetric sub-flow are recombined. In any of the aforementioned cases, the system further includes a second circulation loop configured to circulate a non-alkali gas volumetric flow for use in the alkali vapor laser system. The second circulation loop includes a trap and/or filtration component fluidly coupled with the optical pumping cavity and with the first circulator, a second circulator fluidly coupled with the trap and/or filtration component, and a third heat exchanger fluidly coupled with the second circulator and with the optical pumping cavity. In some cases, the second circulation loop further includes a fourth heat exchanger fluidly coupled with the optical pumping cavity and with the trap and/or filtration component. In any of the aforementioned cases, the alkali vapor laser system comprises a diode-pumped alkali laser (DPAL).

Another example embodiment of the present invention provides a method of adjusting alkali vapor concentration in a lasing gas, the method including dividing a lasing gas volumetric flow into a plurality of volumetric sub-flows, the plurality including at least a first volumetric sub-flow and a second volumetric sub-flow, establishing an alkali vapor concentration in the first volumetric sub-flow at an alkali saturation density corresponding to a first temperature, and recombining the first volumetric sub-flow and the second volumetric sub-flow. In some cases, before recombining the first volumetric sub-flow and the second volumetric sub-flow, the method further includes bringing the second volumetric sub-flow to a second temperature in the range of about 5-30° C. higher than the first temperature of the first volumetric sub-flow. In any of the aforementioned cases, establishing the alkali vapor concentration in the first volumetric sub-flow includes exposing the first volumetric sub-flow to a quantity of liquid alkali metal. In some such cases, the liquid alkali metal comprises at least one of rubidium (Rb), cesium (Cs), and/or potassium (K). In any of the aforementioned cases, before recombining the first volumetric sub-flow and the second volumetric sub-flow, the method further includes maintaining the second volumetric sub-flow at a second temperature that is higher than a condensation temperature of the first volumetric sub-flow. In some cases, the first volumetric sub-flow comprises less than or equal to about 10% of the lasing gas volumetric flow. In some cases, the second volumetric sub-flow comprises greater than or equal to about 90% of the lasing gas volumetric flow. In some cases, the first volumetric sub-flow comprises about 2% of the lasing gas volumetric flow and the second volumetric sub-flow comprises about 98% of the lasing gas volumetric flow.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
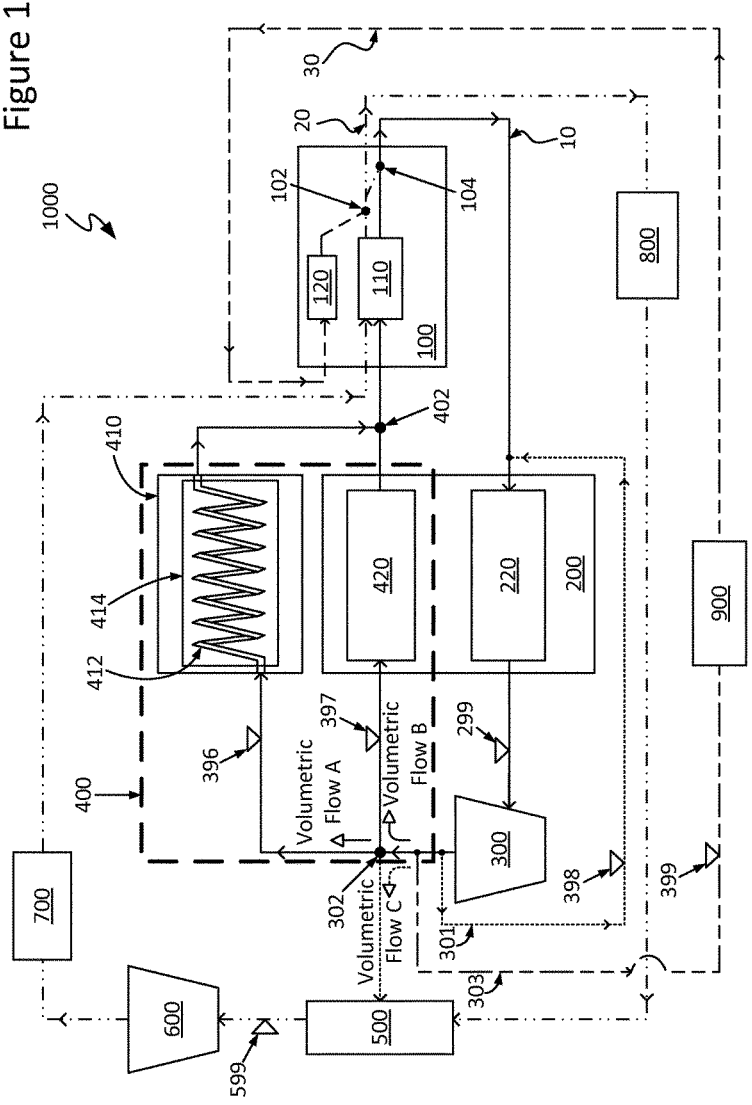
FIG. 1 is a diagram of a system configured in accordance with an embodiment of the present invention.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Techniques and architecture are disclosed for managing alkali vapor concentration in a lasing gas at non-condensing levels. In some instances, the disclosed techniques/architecture can be used to control and/or stabilize the concentration of alkali vapor in a lasing gas volume to any desired fraction of its saturation value under dynamically changing thermal loads. In some such instances, the concentration of alkali vapor in a given lasing gas volume can be maintained at a value which is sufficiently far from the saturation point to prevent or otherwise reduce condensation of the alkali vapor, for example, upon accelerating the lasing gas through a pressure drop into an optical pumping cavity of an alkali vapor laser system (e.g., such as a diode-pumped alkali laser, or DPAL, system). In some instances, the disclosed techniques/architecture can be used to establish a temperature gradient and/or an alkali vapor concentration gradient in the flowing lasing gas volume. Numerous configurations and variations will be apparent in light of this disclosure.

General Overview

Existing laser systems which utilize an optically pumped alkali vapor-saturated gaseous lasing medium (e.g., such as a diode-pumped alkali laser, or DPAL, system) typically strive to maintain a uniform temperature environment in order to stabilize the alkali vapor concentration throughout the system at a known value. Also, such laser systems normally seek to maintain spatially isotropic temperature distributions and alkali vapor concentrations in the optical pumping cavity thereof.

However, as previously indicated, there are a number of non-trivial issues that can arise and complicate laser systems which utilize gaseous lasing media. For instance, one issue pertains to the fact that if the drop in pressure within the optical pumping cavity of an alkali vapor laser system is sufficiently large, then the lasing gas volume may experience a substantial amount of adiabatic cooling. If the flowing lasing gas is saturated with alkali vapor (at or about 100% saturation), then this cooling can cause the alkali vapor to condense out of the lasing gas volume, resulting in homogeneous nucleation of liquid alkali metal droplets within the system. The resultant decrease in alkali vapor concentration of the lasing gas can significantly destabilize DPAL output, thereby precluding a given DPAL system, for example, from continuous-wave (CW) operation at power output levels higher than 10 W. Furthermore, during operation of the system, the liquid alkali metal droplets can be deposited on various surfaces within the system, leading to liquid metal embrittlement for some materials/components, which may in turn cause the system to fail or otherwise perform undesirably.

Thus, and in accordance with one set of embodiments, techniques and system architecture are disclosed for controlling and/or stabilizing alkali vapor concentration in a lasing gas at non-condensing levels. In some instances, the disclosed techniques/architecture can be used to control and/or stabilize the concentration of alkali vapor in a lasing gas volume to any desired fraction of its saturation value under dynamically changing thermal loads. In some such instances, the concentration of alkali vapor in a given lasing gas volume can be maintained at a value which is sufficiently far from the saturation point to prevent or otherwise reduce condensation of the alkali vapor, for example, upon passing the lasing gas through an optical pumping cavity of an alkali vapor laser system (e.g., such as a diode-pumped alkali laser, or DPAL, system).

In some cases, the disclosed techniques/architecture can be used to control the spatial distributions of alkali vapor concentration within a lasing gas volume, for example, by flowing the volume through system enclosures having spatially varying temperatures. In some instances, the disclosed techniques/architecture can be used to establish a temperature gradient and/or an alkali vapor concentration gradient in the flowing lasing gas volume. In some cases, the disclosed techniques/architecture can be used to control the concentration of alkali vapor within a lasing gas volume to a specific value, thereby permitting stable system operation at any selected alkali vapor concentration. In some instances, use of the disclosed techniques/architecture may yield a fixed alkali concentration lower than the saturation point of the alkali metal utilized. Thus, and in accordance with an embodiment, the disclosed techniques/architecture can be used, in some instances, to manage the equation-of-state of: (1) a lasing gas flow; and/or (2) a buffer/carrier (non-alkali) gas flow.

In accordance with an embodiment, the lasing gas volumetric flow of a given alkali vapor laser system (e.g., DPAL system) can be divided into a plurality of separate streams (e.g., divided into two, three, four, or more separate volumetric sub-flows). In some cases, a first, lesser volumetric sub-flow may be passed through an alkali vapor saturator, where it achieves a desired saturation level by being exposed to a quantity of liquid alkali metal and cooled to a predetermined temperature. A second, greater volumetric sub-flow may bypass such saturator and instead be passed through a heat exchanger, where it is maintained at a temperature that is higher than that of the saturator. Downstream of the alkali vapor saturator and the bypass heat exchanger, the volumetric sub-flows may be recombined for use, for example, to enter an optical pumping cavity of an alkali vapor laser system (e.g., such as a diode-pumped alkali laser, or DPAL, system). When the lesser volumetric sub-flow of the lasing gas, cooled and saturated, is recombined with the greater volumetric sub-flow of the lasing gas which bypassed the saturator, the lasing gas flow may be stabilized at a given desired temperature and/or alkali vapor concentration. In some cases, the alkali vapor concentration may be greater than or equal to about 50% (e.g., in the range of about 50-60%, about 60-70%, about 70-80%, about 80-90%, about 90-99%, or any other sub-range that is greater than or equal to about 50%).

In some embodiments, a given lasing gas volume optionally may be divided into a third volumetric sub-flow which is filtered and subjected to a process to remove any alkali vapor therefrom. In some cases, the resultant substantially clean, non-alkali gas may become a component of a circulating volumetric flow of non-alkali gas which may be used downstream. In some cases, a non-alkali gas flow as provided herein may be utilized, for example, as a protective gaseous barrier layer. In some instances, the non-alkali gas volume may be utilized as a protective gaseous barrier layer in the optical pumping cavity of an alkali vapor laser system (e.g., a DPAL system). In some cases, a non-alkali gas volume provided as described herein may be utilized as a protective gaseous barrier layer for the one or more output windows of an alkali vapor laser system (e.g., a DPAL system). Other suitable uses for such a non-alkali gas volumetric flow will depend on a given application and will be apparent in light of this disclosure.

In some embodiments, a system provided as described herein may be configured and/or operated to confine a quantity of liquid alkali metal, for example, to a single robust element (e.g., a helical, tubular coil or other structure, discussed below) which isolates that quantity from the remainder of the system. By maintaining the alkali saturating element at a temperature that is lower than the temperature of other portions/regions throughout the lasing gas circulation loop/circuit, for example, during various phases of operation (e.g., during system warm-up, non-lasing ready state, lasing operation, system cool-down, etc.), the liquid alkali metal may remain substantially segregated in that alkali saturating element. As will be appreciated in light of this disclosure, and in accordance with an embodiment, such a configuration can eliminate or otherwise reduce deposition (e.g., nucleation, condensation, pooling, etc.) of liquid alkali metal on surfaces during system operation, thereby reducing susceptibility of the system to liquid metal embrittlement, as previously discussed.

In some cases, use of the disclosed techniques/architecture may permit the alkali vapor saturating element to be substantially decoupled from the on-off power (and/or other operational phase) of an alkali vapor laser system (e.g., DPAL). In some such instances, the volume of lasing gas flowed through the vapor saturating element, and thus exposed to the liquid alkali metal droplets, can be, in a sense, anchored to the saturation temperature. Thus, and in accordance with an embodiment, there may be little to no variation in alkali vapor density when such alkali vapor laser system is turned on or off. Numerous configurations will be apparent in light of this disclosure.

As previously noted, and in accordance with an embodiment, the disclosed techniques/architecture can be used, for example, in a laser system which utilizes a flowing gaseous lasing medium, such as an alkali vapor laser system (e.g., a diode-pumped alkali laser, or DPAL, system). As will be appreciated in light of this disclosure, and in accordance with an embodiment, the disclosed techniques and/or architecture can be used in side-pumped (e.g., transversely pumped and/or pumped at an angle) and/or end-pumped DPALs (e.g., pumped from one or more ends thereof). In some example embodiments, a DPAL system (or other alkali vapor laser system) implementing the disclosed techniques may be provided with alkali vapor concentration levels that are sufficiently high and/or stable, for example, to achieve DPAL output power in the range of about 20 kW to 10 MW or greater. Other suitable uses and configurations for the disclosed techniques and/or architecture will be apparent in light of this disclosure.

As previously noted, the disclosed techniques and/or architecture can be used, in some embodiments, in an alkali vapor laser system (e.g., DPAL system) which utilizes a flowing alkali vapor-based lasing gas. As used herein, the term "lasing gas" generally may refer to a gas or gas mixture including, for example: (1) a vapor of alkali metal, such as rubidium (Rb), cesium (Cs), potassium (K), etc., having a density in the range of about $1 \times 10^{11}$ atoms/cm$^3$ to $1 \times 10^{16}$ atoms/cm$^3$; (2) a buffer/carrier gas which pressure-broadens the absorption lines of the alkali atom with absolute pressure in the range of about 150-15,000 torr; and/or (3) a buffer/carrier gas to accelerate the atomic spin-orbit transition from the pump level to the lasing level, which may be the aforementioned buffer/carrier gas or one or more other gases.

Also, the disclosed techniques/architecture may be compatible with any of a wide variety of gases which may be utilized as a buffer/carrier (i.e., non-alkali) gas. As used herein, the term "non-alkali gas" generally may refer to a gas or gas mixture including, for example, a buffer gas and/or an atomic spin-orbit transition gas (like those discussed above regarding the lasing gas), but which is devoid of alkali vapor or which has a minimal or otherwise negligible amount of alkali vapor (e.g., alkali vapor has not become a significant component of this gas during system operation or any alkali vapor initially present in the gas has been removed to as low a level as is practical or otherwise desirable). Some example suitable gases include, but are not limited to: (1) inert gases (e.g., elemental gas, compound gas, etc.); (2) noble gases, such as helium (He) and/or isotopes thereof, such as helium-4 ($^4$He), helium-3 ($^3$He), etc.; (3) hydrocarbons, such as methane ($CH_4$), ethane ($C_2H_6$), etc.; (4) fluorocarbons; (5) a combination of any of the aforementioned; and/or (6) any other suitable gas or gaseous mixture which can provide the desired thermal management performance, provide the desired amount of pressure broadening, and/or assist with the desired spin-orbit atomic transitions for the lasing gas, as will be apparent in light of this disclosure.

It should be noted, however, that the claimed invention is not intended to be limited to only these example lasing gases and non-alkali buffer/carrier gases. Rather, any gas or gas mixture having qualities described herein may be suitable to serve as a lasing gas and/or non-alkali buffer/carrier gas. Numerous configurations will be apparent in light of this disclosure.

As will be further appreciated in light of this disclosure, some embodiments of the present invention may be used to provide a DPAL system which exhibits an improved/enhanced service lifetime and which is compatible with high-power (e.g., kilowatt- and/or megawatt-class), continuous-wave (CW) operation. Such a DPAL system may be utilized, in accordance with one or more embodiments, in any of a wide variety of applications, such as, but not limited to: (1) welding and metal cutting; (2) mining; (3) medical procedures; (4) directed energy weapons (DEWs) and countermeasures; (5) deorbiting space debris; and/or (6) any other directed energy application (e.g., transmitting energy to a deep-space probe). In some instances, and in accordance with an embodiment, a DPAL system provided using the disclosed techniques and/or architecture can be configured, for example, to be deployed on a vehicle (e.g., land vehicle, watercraft, aircraft, spacecraft, etc.), an infrastructure (e.g., building, bunker, etc.), and/or any other desired platform, temporary or permanent. Other suitable uses will be apparent in light of this disclosure.

System Architecture and Operation

FIG. 1 is a diagram of a system 1000 configured in accordance with an embodiment of the present invention. As can be seen, in some cases system 1000 may include, for example: an alkali vapor laser system 100 including an optical pumping cavity 110 and one or more output windows 120; a heat exchanger 220 downstream of alkali vapor laser system 100 and thermally coupled with a thermal reservoir 200; a circulator/compressor 300 downstream of heat exchanger 220; and an alkali vapor concentration management sub-system 400 downstream of circulator/compressor 300 and upstream of alkali vapor laser system 100. In some cases, alkali vapor concentration management sub-system 400 may include: an alkali vapor saturator 410 including a saturating element 412 thermally coupled with a thermal reservoir 414; and a bypass heat exchanger 420 optionally thermally coupled with a thermal reservoir 200. In some embodiments, system 1000 optionally further may include: a trap and/or filtration component 500 downstream of circulator/compressor 300 and downstream of optical pumping cavity 110; a circulator/compressor 600 downstream of trap and/or filtration component 500; a heat exchanger 700 downstream of circulator/compressor 600 and upstream of optical pumping cavity 110; and a heat exchanger 800 downstream of optical pumping cavity 110 and upstream of trap and/or filtration component 500. As will be appreciated in light of this disclosure, system 1000 may include additional, fewer, and/or different elements or components from those here described (e.g., volume/pressure controllers, reservoirs, etc.), and the claimed invention is not intended to be limited to any particular system configurations, but can be used with numerous configurations in numerous applications. For instance, in some embodiments, system 1000 optionally may include a trap and/or filtration component 900 upstream of the one or more output windows 120 of alkali vapor laser system 100.

As can be seen from the embodiment depicted in FIG. 1, in some cases, system 1000 may be configured to circulate a lasing gas volume along circulation loop 10 (generally represented by solid-lined arrows). In some instances, system 1000 also may be configured to circulate a non-alkali gas volume along circulation loop 20 (generally represented by dashed-and-dotted-line arrows). It should be noted, however, that system 1000 is not so limited to circulation loops 10 and/or 20. For example, in some cases, system 1000 also may be configured to circulate a non-alkali gas volume along circulation loop 30 (general represented by double-dashed arrows). Additional and/or different circulation loops optionally may be provided as desired for system 1000, as will be apparent in light of this disclosure. System 1000 may be configured, in some embodiments, to circulate a lasing gas volume and/or a non-alkali gas volume during any one or more of its various phases of operation (e.g., during system warm-up, non-lasing ready state, lasing operation, system cool-down, etc.).

As will be appreciated in light of this disclosure, inefficiencies in a given lasing process may result from a number of considerations. For example, in some cases, heat associated with spin-orbit quenching may be deposited into the lasing gas volume. Also, in some cases, heat associated with parasitic lasing processes (e.g., spontaneous decay of excited levels resulting in fluorescence; amplified spontaneous emission (ASE); etc.) may be deposited, for example, on system surfaces (e.g., of the optical pumping cavity 110, of one or more output windows 120, of the lasing volume, of any conduit utilized in the non-alkali gas flow, etc.), which in turn may transfer that heat, at least in part, to the non-alkali gas flow. Still further, in some cases, inefficiencies associated with less-than-full absorption of the one or more optical pumping beams may result in heat being deposited, for example, into the non-alkali gas flow.

Thus, in some embodiments, system 1000 may be generally configured as a closed-loop circulation system configured to circulate a lasing gas volumetric flow and/or a non-alkali gas volumetric flow, for instance, while regulating one or more of temperature, pressure, and/or alkali vapor concentration. In some instances, a given system 1000 can be used, for example, to controllably change alkali vapor concentration in a lasing gas volumetric flow at non-condensing levels (e.g., for use in an alkali vapor laser system) while flowing the lasing gas through a plurality of enclosures held at different temperatures. In some such instances, alkali density in the lasing gas volumetric flow may be stabilized while: (1) removing excess heat deposited into the lasing gas flow during its transit around circulation loop 10 (e.g., deposited by one or more optical pumping beams in optical pumping cavity 110, the output beam of alkali vapor laser system 100 passing through a given output window 120, compression processes at circulator/compressor 300, etc.); and/or (2) removing excess heat deposited into the non-alkali gas flow during its transit around circulation loop 20 (e.g., deposited by one or more optical pumping beams in optical pumping cavity 110, compression processes at circulator/compressor 600, etc.). Also, as can be seen, system 1000 can be configured to utilize a plurality of separate, dedicated thermal stabilization reservoirs (e.g., thermal reservoirs 200, 414, etc.). By virtue of such configuration, system 1000 may exhibit high thermal stability and/or be highly tunable, in some embodiments.

In some embodiments, system 1000 may be capable of withstanding variable absolute pressures in the range of about 1-20 bar or greater, and in some cases, absolute pressures of about 1 bar or less. As will be appreciated in light of this disclosure, in some cases in which the buffer/carrier gas for the lasing gas volumetric flow is also utilized as the quenching gas, the pressure to quench the spin-orbit transition (i.e., pumping level to lasing level) may be, for example, in the range of about 5-20 atm. As will be further appreciated, at these high pressures, pressure broadening may be sufficiently high such that laser linewidth need not be narrow. In some instances, this amount of pressure broadening may permit further excitation to levels above the pumping level and/or ionization. If a dedicated, efficient quenching gas is utilized, then the absolute pressure to produce quenching may be, for example, in the range of about 400-750 torr. As will be further appreciated, at these pressures, pressure broadening may be sufficiently low such that laser linewidth is relatively narrow (e.g., in the range of about 50-100 pm). In some instances, this amount of pressure broadening may reduce chances of further excitation above the pumping level.

In some embodiments, system 1000 may be capable of withstanding variable temperatures in the range of about 50-250° C. or greater (e.g., in the range of about 80-225° C. or greater). Furthermore, in some embodiments, system 1000 may be configured to provide mass flow rates variable between about 1-1000 g/s or higher (e.g., about 100 g/s or higher) for use in optical pumping cavity 110. Still further, in some cases, system 1000 may be configured to provide gas flows (e.g., lasing gas volumetric flow, non-alkali gas volumetric flow, etc.) having a velocity in the range of about 50-1000 m/s or greater. Other suitable pressure, temperature, mass flow rate, and/or flow velocity ranges for a given system 1000 will depend on a given application and will be apparent in light of this disclosure.

In accordance with an embodiment, alkali vapor laser system 100 may be a laser system which utilizes, for example, a flowing gaseous lasing medium containing a vapor of alkali metal, such as, but not necessarily limited to: (1) rubidium (Rb); (2) cesium (Cs); (3) potassium (K);

and/or (4) any other suitable alkali metal, as will be apparent in light of this disclosure. As previously noted, alkali vapor laser system 100 may include an optical pumping cavity 110. In some cases, a lasing gas volumetric flow of system 1000 may be passed through pumping cavity 110, for example, along circulation loop 10. Also, in some instances (discussed below), a non-alkali gas volume of system 1000 may be passed through pumping cavity 110, for example, along circulation loop 20. In some cases (discussed below), a non-alkali gas volumetric flow of system 1000 may be flowed along a given output window 120, for example, via circulation loop 30.

While traversing optical pumping cavity 110, the lasing gas volumetric flow may be optically pumped by any of a wide variety of optical pumping sources and/or methods, in accordance with an embodiment. For instance, in some embodiments, alkali vapor laser system 100 may be a diode-pumped alkali laser (DPAL) system wherein optical pumping of the lasing gas is provided by one or more laser diodes (e.g., laser diode bars, stacks, arrays, etc.). As will be appreciated in light of this disclosure, and in accordance with an embodiment, the lasing gas volumetric flow can be pumped at any desired optical pumping wavelength (e.g., 780 nm, etc.) and/or spectral linewidths. Other suitable configurations for optical pumping cavity 110 and/or alkali vapor laser system 100 will depend on a given application and will be apparent in light of this disclosure.

In accordance with an embodiment, after passing through optical pumping cavity 110, the lasing gas volumetric flow may be passed through a heat exchanger 220 downstream of optical pumping cavity 110. Heat exchanger 220 may be configured to aid in the removal of excess heat deposited into the lasing gas flow, for example, by the one or more optical pumping beams utilized in optical pumping cavity 110 and/or the output beam of alkali vapor laser system 100 (e.g., as it is passed through a given output window 120). In some embodiments, heat exchanger 220 may be configured as a gas-to-liquid heat exchanger (i.e., a cooler) capable of handling about 10-200 kW of cooling (or greater). In one example embodiment, heat exchanger 220 may be a Sanitary Single Tubesheet Heat Exchanger Model #00686-6 produced by Exergy, LLC. In some cases, heat exchanger 220 may be configured substantially identically with bypass heat exchanger 420 (discussed below), while in some other cases, they may be configured differently from one another. Other suitable types and/or configurations for heat exchanger 220 will depend on a given application and will be apparent in light of this disclosure.

In some cases, heat exchanger 220 may be thermally coupled, for example, with a thermal reservoir 200. In some instances (discussed below), thermal reservoir 200 optionally also may be shared with bypass heat exchanger 420 (i.e., heat exchanger 220 and bypass heat exchanger 420 optionally may be thermally stabilized together within a common thermal reservoir 200). Thermal reservoir 200 may be held at any desired temperature, and in some instances, may be held above the saturation temperature associated with the desired alkali vapor concentration (e.g., in the case of Rb, about 5-30° C. above the saturation temperature thereof).

In some cases, heat exchanger 220 may be configured, for example, to reduce the temperature of the lasing gas volumetric flow (e.g., which, after passing through optical pumping cavity 110, may be in the range of about 180-200° C.) to within about 1-10° C. (e.g., less than or equal to about 5° C.) above the temperature of thermal reservoir 200, which may be held at a temperature that is warmer (e.g., about 5-30° C. warmer) than the condensation point of the alkali vapor (e.g., Rb). As previously noted, and in accordance with an embodiment, it may be desirable to maintain the temperature of the lasing gas volumetric flow above the saturation point to avoid condensing the alkali vapor in heat exchanger 220 (and/or elsewhere in system 1000). In some instances, it may be desirable to ensure that the temperature of the lasing gas volumetric flow exiting heat exchanger 220 is about equal to the temperature of the lasing gas volumetric flow as it enters optical pumping cavity 110.

In accordance with an embodiment, heat exchanger 220 may remove a variable amount of heat deposited in the lasing gas volumetric flow (e.g., deposited by the one or more optical pumping beams and/or output beam of alkali vapor laser system 100) and deliver the cooled lasing gas volume to a downstream circulator/compressor 300. In some cases, circulator/compressor 300 may be dedicated, in accordance with an embodiment, to circulation loop 10 (i.e., may be configured to circulate only the lasing gas volumetric flow). Passage of the lasing gas volumetric flow through circulator/compressor 300 may raise the pressure of the lasing gas volume, for example, for subsequent acceleration through optical pumping cavity 110. As will be appreciated in light of this disclosure, and in accordance with an embodiment, the velocity of the lasing gas flow can be altered, for example, by adjusting the impeller speed of circulator/compressor 300.

During its passage through circulator/compressor 300, the lasing gas volumetric flow may undergo adiabatic compression, which may result in an increase in temperature of the lasing gas volumetric flow in the range of about 1-15° C. (e.g., about 5-10° C.). However, as will be appreciated in light of this disclosure, the actual temperature rise of the lasing gas volumetric flow as it passes through circulator/compressor 300 can be, in some cases: (1) greater due to heat generated by turbine inefficiencies, friction, etc.; and/or (2) lower if heat is lost to the environment surrounding system 1000. It should be noted, however, that these thermal uncertainties may be obviated, for example, by virtue of inclusion in system 1000 of alkali vapor concentration management sub-system 400 (discussed below).

Figure 2:
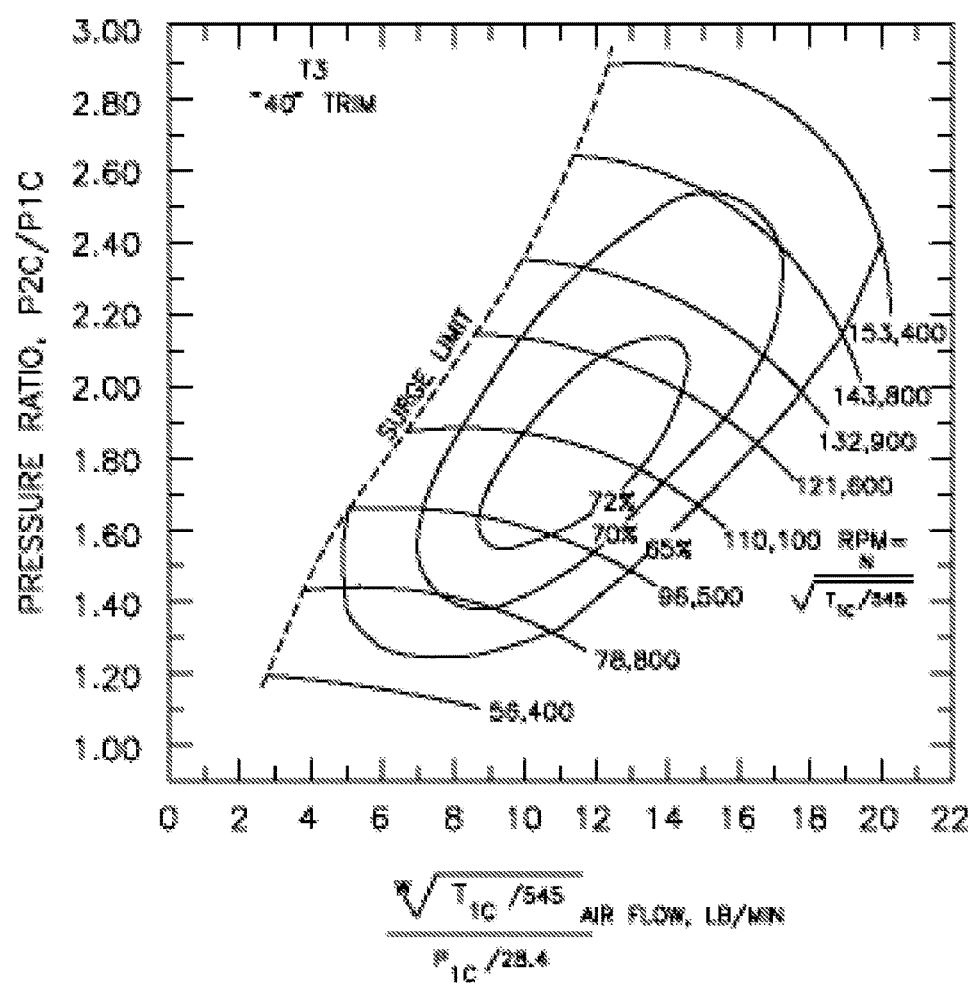
FIG. 2 is a compressor map of an example type of circulator/compressor suitable for use in a system configured in accordance with an embodiment of the present invention.

In some cases, circulator/compressor 300 may be, for example, a low-pressure, high-flow centrifugal impeller turbine compressor. For example, FIG. 2 is a compressor map of an example type of circulator/compressor 300 suitable for use in system 1000, in accordance with an embodiment of the present invention. As will be appreciated in light of this disclosure, circulator/compressor 300 can be a commercially-available and/or custom component/system. In some instances, it may be desirable to ensure that circulator/compressor 300 is capable of supporting a mass flow rate in the range of about 10-1000 g/s or greater (e.g., for use with an alkali vapor laser system 100). Other suitable types and/or configurations for circulator/compressor 300 will depend on a given application and will be apparent in light of this disclosure.

In some cases, the flow rate of the lasing gas volumetric flow may be sufficiently limited (e.g., by virtue of the configuration of optical pumping cavity 110) such that it approaches or crosses the surge limit (stall speed) of the impeller of circulator/compressor 300. Thus, in some instances, it may be desirable to provide an optional flow channel 301, for example, which bypasses the optical pumping cavity 110. In the example embodiment depicted in FIG. 1, this optional flow channel 301 may connect the output end of circulator/compressor 300 to a point just before heat exchanger 220, effectively bypassing some lasing gas around the alkali vapor concentration management sub-system 400 (e.g., around alkali vapor saturator 410 and bypass heat exchanger 420) and the optical pumping cavity 110. As a result, circulator/compressor 300 may be permitted, in some instances, to operate approximately in the center of its most stable pressure-flow rate regime.

In some cases, it may be desirable to regulate the pressure and/or velocity of the lasing gas flow as it enters circulator/compressor 300 (e.g., to provide some degree of pressure recovery downstream of optical pumping cavity 110 to help reduce the demands on downstream circulator/compressor 300). To that end, and in accordance with an embodiment, a flow controller 299 optionally may be implemented upstream of circulator/compressor 300. Also, in some cases, a flow controller 398 optionally may be implemented along flow channel 301, as can be seen in FIG. 1.

Alkali Vapor Concentration Management Sub-System

Downstream of circulator/compressor 300, the lasing gas volumetric flow, in part or in whole, may be passed through an alkali vapor concentration management sub-system 400, in accordance with an embodiment. As previously noted, alkali vapor concentration management sub-system 400 may include, for example: an alkali vapor saturator 410 including a saturating element 412 thermally coupled with a thermal reservoir 414; and a bypass heat exchanger 420 optionally thermally coupled with a thermal reservoir 200 (e.g., which optionally may be shared, in some instances, with heat exchanger 220). As will be appreciated in light of this disclosure, alkali vapor concentration management sub-system 400 may include additional, fewer, and/or different elements or components from those here described (e.g., liquid alkali metal reservoir, etc.), and the claimed invention is not intended to be limited to any particular configurations, but can be used with numerous configurations in numerous applications.

At a branching point 302 downstream of circulator/compressor 300, the lasing gas volumetric flow may be separated/divided into a plurality of volumetric sub-flows (e.g., divided into two, three, four, or more separate volumetric sub-flows), some or all of which may be directed, in accordance with an embodiment, through alkali vapor concentration management sub-system 400. In some embodiments, alkali vapor concentration management sub-system 400 may be configured for dual-path, dual-temperature circulation of the lasing gas volumetric flow. That is, at branching point 302, a first portion of the lasing gas flow (e.g., less than or equal to about 10% of the total available lasing gas volumetric flow)—hereinafter, Volumetric Flow A—may be directed along a first flow path of circulation loop 10 which passes through alkali vapor saturator 410 (discussed below) where it can be saturated with alkali vapor and cooled in the process. A second portion of the lasing gas (e.g., greater than or equal to about 90% of the total available lasing gas volumetric flow)—hereinafter, Volumetric Flow B—may be directed along a second flow path of circulation loop 10 which passes through bypass heat exchanger 420 (discussed below) where it bypasses alkali vapor saturator 410 and is maintained at a temperature that is higher than in saturator 410 in the process.

It should be noted, however, that the claimed invention is not so limited to division of the lasing gas volumetric flow into only two sub-flows. For instance, in some embodiments, a third portion of the lasing gas volumetric flow (e.g., less than or equal to about 2% of the total available lasing gas volumetric flow)—hereinafter, Volumetric Flow C—optionally may be diverted away from circulation loop 10 (e.g., as generally indicated in FIG. 1 by the dotted arrow going to the left at branching point 302) and directed, for example, to a trap and/or filtration component 500 (discussed below) for subsequent circulation along circulation loop 20. Divisions/separations of the lasing gas volumetric flow into additional and/or different volumetric sub-flows (e.g., two, three, four, or more separate volumetric sub-flows) may be performed as desired for a given target application or end-use. For example, in some cases, a fraction of the total available lasing gas volumetric flow optionally may be diverted away from circulation loop 10 and directed, for example, to a trap and/or filtration component 900 (discussed below) for subsequent circulation along circulation loop 30. In a more general sense, the quantity and proportionality of the one or more volumetric sub-flows of gas diverted from circulation loop 10 can be customized for a given target application or end-use.

In some cases, a flow controller 396 optionally may be implemented downstream of branching point 302, for example, along the portion of circulation loop 10 corresponding with Volumetric Flow A. Also, in some cases, a flow controller 397 optionally may be implemented downstream of branching point 302, for example, along the portion of circulation loop 10 corresponding with Volumetric Flow B. Other suitable placements for the one or more flow controllers of system 1000 will depend on a given application and will be apparent in light of this disclosure.

In accordance with an embodiment, alkali vapor saturator 410 may be configured, in some example instances, to aid in managing (e.g., establishing, maintaining, and/or controlling) the concentration of alkali vapor in Volumetric Flow A (and thus in a lasing gas volumetric flow including Volumetric Flows A and B, for example, upon recombination thereof at a recombination point 402). In some cases, alkali vapor saturator 410 may be configured to liberate alkali vapor at concentrations characteristic of its saturation density.

To that end, and in accordance with an embodiment, alkali vapor saturator 410 may include a saturating element 412 configured to have distributed therein a given quantity of liquid alkali metal, for example, to aid in saturating Volumetric Flow A as it is passed therethrough. In some embodiments, saturating element 412 may include one or more features which enhance the exposure of Volumetric Flow A to the liquid alkali metal. For instance, in some embodiments, saturating element 412 may include a plurality of indentations and/or corrugations formed along its length. When included, a given indentation/corrugation may be configured to permit a small droplet of the liquid alkali metal to reside therein. By virtue of such a configuration, the quantity of liquid alkali metal may be distributed discontinuously within saturating element 412 so as to provide Volumetric Flow A with exposure to a large surface area of liquid alkali metal as it is passed therethrough.

In accordance with an embodiment, the dimensions of a given indentation/corrugation may be customized for a given application or end-use. In one example embodiment, a given indentation/corrugation may be dimensioned such that a droplet of liquid alkali metal retained therein may have, for instance: (1) a diameter (or other dimension) of less than or equal to about 1 mm; and/or (2) a volume of less than or equal to about 1 $mm^3$. However, the claimed invention is not so limited, and any given indentation/corrugation of saturating element 412 may be configured/dimensioned to provide a droplet of larger and/or smaller size, as desired. Also, as will be appreciated in light of this disclosure, it may be desirable to ensure that the indentations and/or corrugations of saturating element 412, and thus the droplets retained therein, are spaced sufficiently far apart from one another, for example, to prevent or otherwise reduce merging of neighboring/adjacent droplets. In one example embodiment, saturating element 412 may be configured such that the distance between neighboring/adjacent droplets is in the range of about 1-5 mm or greater. In some cases, it may be desirable to enforce the separation between neighboring/adjacent droplets, and, in some such instances, enforce the separations in different orientations. Other suitable droplet sizes and/or spacing ranges will depend on a given application and will be apparent in light of this disclosure. It should be noted, however, that the claimed invention is not so limited, as in some embodiments, a given degree of wetting of the interior surface of saturating element 412 with the liquid alkali metal may be provided, as desired for a given application or end-use. In some cases, a mesh (e.g., copper or other suitable material, as will be apparent in light of this disclosure) may be utilized, for example, to aid in providing a desired degree of wetting of the interior surface of saturating element 412 with the liquid alkali metal.

In some cases, the indentations and/or corrugations may be provided such that the droplets are substantially uniformly and discontinuously distributed along the length of saturating element 412. However, the claimed invention is not so limited, as in some other cases, saturating element 412 may be configured with indentations and/or corrugations which provide a desired non-uniform, discontinuous droplet distribution along its length. Also, it may be desirable to ensure that the indentations and/or corrugations of saturating element 412, as well as any bend angles thereof (if present), minimally or otherwise negligibly affect the pressure rating of saturating element 412. Numerous suitable configurations will be apparent in light of this disclosure.

In accordance with an embodiment, saturating element 412 can be constructed from any of a wide range of materials, including, but not necessarily limited to, stainless steel and/or glass. It may be desirable, in some instances, to ensure that saturating element 412 is constructed from a material that can withstand temperatures in the range of about 100-250° C. or greater (e.g., about 150-200° C. or greater). In some cases, saturating element 412 may be constructed with a flexible material. In some such instances, saturating element 412 optionally may include an exterior braided sheath, for example, to help limit bend radius and/or to provide support to help raise the sustainable pressure of saturating element 412. Numerous suitable construction materials and/or configurations for saturating element 412 will be apparent in light of this disclosure.

Also, and in accordance with an embodiment, the dimensions of saturating element 412 may be customized for a given application or end-use. In some cases, saturating element 412 may benefit from having a total length (i.e., the length as measured from the opening at one end of saturating element 412 to the opening at the other end thereof) in the range of about 0.1-10 m or greater (e.g., in the range of about 1-5 m, about 5-10 m, etc.), for example, to aid in exposing Volumetric Flow A to a large surface area of liquid alkali metal. Thus, as will be appreciated in light of this disclosure, it may be desirable in some instances to configure saturating element 412 as a generally helical, tubular coil, for example, to aid in achieving a compact system or otherwise reducing system bulk/footprint. In some instances, saturator element 412 may have a diameter/width (i.e., a cross-sectional diameter/width of the tube that is formed into a helical coil geometry) in the range of about 0.1-10 cm or greater (e.g., in the range of about 1-5 cm or greater). As will be appreciated in light of this disclosure, adjustment of the spacing between neighboring/adjacent indentations and/or corrugations (and thus neighboring/adjacent droplets of liquid alkali metal) may call for adjustment in the length and/or diameter/width of saturator element 412. However, as will be further appreciated in light of this disclosure, adjustment of the length and/or diameter/width of saturating element 412 may result in changes in the flow velocity of Volumetric Flow A and/or transit time thereof through saturating element 412, which in turn may alter the circulation of the total lasing gas volumetric flow through circulation loop 10. Thus, it may be desirable, in some instances, to ensure that the dimensions and/or parameters of saturating element 412 allow for a sufficient mass flow rate, for example, for use in the optical pumping cavity 110 of alkali vapor laser 100, while providing sufficient exposure of Volumetric Flow A to the liquid alkali metal to achieve a desired concentration at a desired temperature.

Distribution of the liquid alkali metal in the form of droplets throughout the length of saturating element 412 can be accomplished by any of a wide variety of techniques. For instance, in some example cases in which saturating element 412 is configured as a helical, tubular coil, a quantity of liquid alkali metal may be disposed therein and saturating element 412 can be inclined at an angle (e.g., in the range of about 1-90° from horizontal; substantially parallel to the direction of gravity; etc.) and rotated about its inclined axis. As the quantity of liquid alkali metal within saturating element 412 encounters a given indentation and/or corrugation of saturating element 412, a small amount may be effectively sheared off from the bulk of liquid alkali metal and retained by a given indentation/corrugation while the remaining bulk progresses along saturating element 412, encountering additional indentations and/or corrugations. Alternatively, in some example cases in which a flexible saturating element 412 is provided, a quantity of liquid alkali metal can be loaded into a syringe-like device having a sufficiently long delivery capillary/needle (which, in some cases, also may be flexible) for delivering/depositing the metal within the flexible saturating element 412. As the capillary/needle is withdrawn from saturating element 412, individual droplets can be delivered/deposited in each indentation and/or corrugation. Other suitable techniques for distributing droplets of liquid alkali metal within saturating element 412 will depend on a given application and will be apparent in light of this disclosure.

It may be desirable to hold the liquid alkali metal contained within saturating element 412 at a given desired temperature, for example, to aid in achieving a desired alkali vapor concentration for Volumetric Flow A. To that end, and in accordance with an embodiment, saturating element 412 may be thermally coupled with a thermal reservoir 414, for example, to aid in thermally stabilizing saturator element 412. In some cases, such thermal coupling may be achieved, for example, by submerging or otherwise immersing saturating element 412 in thermal reservoir 414. In some embodiments, thermal reservoir 414 may be a silicone oil bath; however, the claimed invention is not so limited, and other suitable configurations and/or types of thermal reservoir 414 will depend on a given application and will be apparent in light of this disclosure.

In accordance with an embodiment, thermal reservoir 414 may be held at a temperature that corresponds with the saturation temperature associated with the desired alkali vapor concentration for Volumetric Flow A. For instance, in the example case of a Rb-based lasing gas, the temperature associated with 90% Rb vapor saturation is about 3° C. higher than the 100% Rb vapor saturation temperature. If there is a pressure drop of about 5% as the lasing gas volumetric flow (e.g., combined Volumetric Flows A and B) traverses optical pumping cavity 110, then the resultant adiabatic cooling therein may be about 10° C. Thus, it may be desirable, for example, to ensure that Volumetric Flow A leaves alkali vapor saturator 410 at about 10-20° C. (e.g., about 13° C. or greater) above the 100% saturation temperature for the Rb vapor, thereby permitting the lasing gas (combined Volumetric Flows A and B) which passes through optical pumping cavity 110 to be at a temperature in the range of about 0.1-10° C. (e.g., about 3° C.) above the 100% saturation temperature. Also, as will be appreciated in light of this disclosure, and in accordance with an embodiment, it may be desirable to ensure that the temperature of thermal reservoir 414 is: (1) lower than the temperature of the rest of system 1000 (e.g., alkali vapor saturator 410 may be the coldest system component relative to the other components/portions of system 1000), which may aid in preventing or otherwise minimizing condensation of the alkali metal outside of saturator element 412; and/or (2) different from that of bypass heat exchanger 420 (discussed below). Other suitable temperature ranges and/or considerations for thermal reservoir 414 will depend on a given application and will be apparent in light of this disclosure.

In some cases, alkali vapor concentration management sub-system 400 optionally may include a reservoir for storing a given quantity of liquid alkali metal. Upon decision to operate/fire alkali vapor laser system 100, for example, the path through alkali vapor saturator 410 may open, and Volumetric Flow A may be passed through saturating element 412, where it may be exposed to the liquid alkali metal droplets disposed therein. Since Volumetric Flow A may be only a portion of the total lasing gas volumetric flow, several cycles of circulation along circulation loop 10 may be desired for the lasing gas to approach equilibrium at a given desired alkali vapor density. After firing, the lasing gas volumetric flow may continue cycling along circulation loop 10, in some instances while optionally lowering the temperature of thermal reservoir 414. Over a sufficient number of cycles around circulation loop 10, the alkali vapor thus may be returned to the liquid alkali metal reservoir.

By virtue of its bellows-like configuration (e.g., provided by the indentations and/or corrugations), saturating element 412 may provide Volumetric Flow A with exposure to a large surface area of liquid alkali metal as it passes therethrough. As Volumetric Flow A flows through alkali vapor saturator 410, it may come into contact with the exposed surface of the liquid alkali metal droplets disposed within the indentations and/or corrugations of saturating element 412. Exposure to the liquid alkali metal may help to alter the concentration of alkali vapor in Volumetric Flow A during each pass through saturating element 412 (i.e., the alkali vapor pressure of Volumetric Flow A may approach, closer and closer, its equilibrium value through mass transfer with the liquid alkali metal). Because Volumetric Flows A and B are recombined each cycle (e.g., at a recombination point 402), over several cycles through circulation loop 10, the total lasing gas volumetric flow may both enter and leave the alkali vapor concentration management sub-system 400 with a steady-state equilibrium concentration. In accordance with an embodiment, once this steady-state is achieved, it generally may not be disrupted, for example, by thermal transients, such as activating/deactivating the lasing process.

Also, Volumetric Flow A may be cooled during its transit (e.g., over one or more cycles) through alkali vapor saturator 410 by virtue of thermal coupling of saturating element 412 with thermal reservoir 414. This cooling may aid in equilibrating the alkali vapor concentration in Volumetric Flow A during its transit through saturating element 412. As a result, and in accordance with an embodiment, the total volume of lasing gas can reach an equilibrium density in a relatively brief period of time (e.g., in the range of about 0.1-5 seconds). As will be appreciated in light of this disclosure, it may be desirable to ensure that Volumetric Flow A leaves alkali vapor saturator 410 substantially free of liquid alkali metal droplets (e.g., Volumetric Flow A has not borne/carried away or otherwise forced any of the discrete liquid alkali metal droplets out of saturating element 412).

In accordance with an embodiment, adjustment can be made to any of a number of variables associated with alkali vapor saturator 410 to achieve a desired alkali vapor concentration in Volumetric Flow A. For instance, changes in alkali vapor concentration may be provided by adjusting: (1) the surface area of liquid alkali metal; (2) the transit time of Volumetric Flow A through saturating element 412; and/or (3) the product of these values. Other variables/parameters which may be adjusted to produce changes in alkali vapor concentration for Volumetric Flow A will depend on a given application and will be apparent in light of this disclosure.

In some instances during operation of system 1000 (e.g., during cool-down), the lasing gas volumetric flow may have an alkali vapor density that is higher than desired. Thus, and in accordance with an embodiment, it may be desirable to ensure that alkali vapor saturator 410 is also provided with the ability to condense alkali vapor out of the lasing gas volumetric flow as it is flowed through alkali vapor saturator 410, for example, during system cool-down. In other words, in some embodiments, alkali vapor saturator 410 may be bi-directional, capable of both raising and lowering the alkali density when desired (e.g., increasing the alkali vapor density on system start-up; decreasing the alkali vapor density on system cool-down; etc.). Numerous configurations will be apparent in light of this disclosure.

In some embodiments, system 1000 may be configured to maintain saturating element 412 at a reduced temperature as compared to its other components during start-up operation. Also, in some embodiments, system 1000 may be configured to reduce the temperature of saturating element 412 while maintaining an elevated temperature for its other components, allowing for condensing of alkali metal out of the lasing gas volumetric flow during cool-down operation. Between the start-up and operational phases of system 1000, saturating element 412 may undergo a gradual increase in temperature, for example, until a given temperature associated with a given saturation concentration is achieved, in accordance with some embodiments. In some cases, after reaching saturation (e.g., when saturating element 412 reaches the steady-state temperature), system 1000 may continue to generally operate at steady equilibrium.

As previously noted, alkali vapor concentration management sub-system 400 may include a bypass heat exchanger 420. In accordance with an embodiment, Volumetric Flow B may be passed through bypass heat exchanger 420, which may be configured to aid in the removal of excess heat: (1) remaining in the lasing gas flow after passage thereof through optical pumping cavity 110 (e.g., which may have been deposited by the one or more optical pumping beams and/or output beam of alkali vapor laser system 100 and/or parasitic lasing processes, such as spontaneous emission, amplified spontaneous emission (ASE), etc.); and/or (2) deposited into the lasing gas flow during the compression process at circulator/compressor 300. In some embodiments, bypass heat exchanger 420 may be configured, for example, as a gas-to-liquid heat exchanger (i.e., a cooler) capable of handling about 10-200 kW of cooling (or greater). In one example embodiment, bypass heat exchanger 420 may be a Sanitary Single Tubesheet Heat Exchanger Model #00686-6 produced by Exergy, LLC. In some cases, bypass heat exchanger 420 may be configured in much the same way as heat exchanger 220 (discussed above), while in some other cases they may be configured differently from one another. In some instances, the variation in the amount of heat removed, for example, by bypass heat exchanger 420 may be significantly less than the variation for heat exchanger 220 (discussed above), and thus the temperature of Volumetric Flow B exiting bypass heat exchanger 420 may have comparatively lower temperature variations. Other suitable types and/or configurations for bypass heat exchanger 420 will depend on a given application and will be apparent in light of this disclosure.

In some cases, bypass heat exchanger 420 optionally may be thermally coupled, for example, with thermal reservoir 200. In some cases, such thermal coupling may be achieved, for example, by flowing liquid from thermal reservoir 200 through one or more liquid channels of bypass heat exchanger 420. As previously noted, in some instances, thermal reservoir 200 optionally may be shared with heat exchanger 220 (i.e., bypass heat exchanger 420 and heat exchanger 220 optionally may be thermally stabilized together within a common thermal reservoir 200). In some embodiments, thermal reservoir 200 may be a silicone oil thermally stabilized flow system; however, the claimed invention is not so limited, and other suitable configurations and/or types of thermal reservoir 200 will depend on a given application and will be apparent in light of this disclosure. In some instances, the fluid or other medium utilized by thermal reservoir 200 may be permitted to flow first to bypass heat exchanger 420, then to heat exchanger 220, after which the excess heat carried away by the fluid/medium can be provided, for example, to an exhaust before return of the fluid/medium to bypass heat exchanger 420.

In accordance with an embodiment, thermal reservoir 200 may be held at any desired temperature, and in some instances, may be held above the saturation temperature associated with the desired alkali vapor concentration (e.g., in the case of Rb, about 30° C. above the saturation temperature thereof). Also, as will be appreciated in light of this disclosure, and in accordance with an embodiment, it may be desirable to ensure that the temperature of thermal reservoir 200 (and thus bypass heat exchanger 420) is different from that of alkali vapor saturator 410 (discussed above). In some embodiments, bypass heat exchanger 420 (with thermally coupled thermal reservoir 200) may be configured, for example, to reduce the temperature of Volumetric Flow B by about 10-20° C. to a stable temperature that is about 5-15° C. warmer, for example, than the condensation point for the alkali vapor (e.g., in the case of a Rb-based lasing gas, about 8-10° C. warmer than the Rb condensation point). Other suitable temperature ranges and/or considerations for thermal reservoir 200 and/or bypass heat exchanger 420 will depend on a given application and will be apparent in light of this disclosure.

As previously noted, Volumetric Flow A and Volumetric Flow B may be recombined at a recombination point 402 (along circulation loop 10) that is downstream of alkali vapor saturator 410 and bypass heat exchanger 420 and upstream of optical pumping cavity 110. After passing through alkali vapor saturator 410, the resultant cooled and saturated Volumetric Flow A (e.g., less than or equal to about 10% of the total lasing gas volumetric flow) may be recombined with Volumetric Flow B (e.g., greater than or equal to about 90% of the total lasing gas volumetric flow) that passed through bypass heat exchanger 420. In accordance with an embodiment, recombination of these sub-volumetric flows may yield a lasing gas flow having a stable alkali vapor concentration at any desired saturation level at a given temperature, which may be utilized, for example, in optical pumping cavity 110 of alkali vapor laser system 100.

Figure 3:
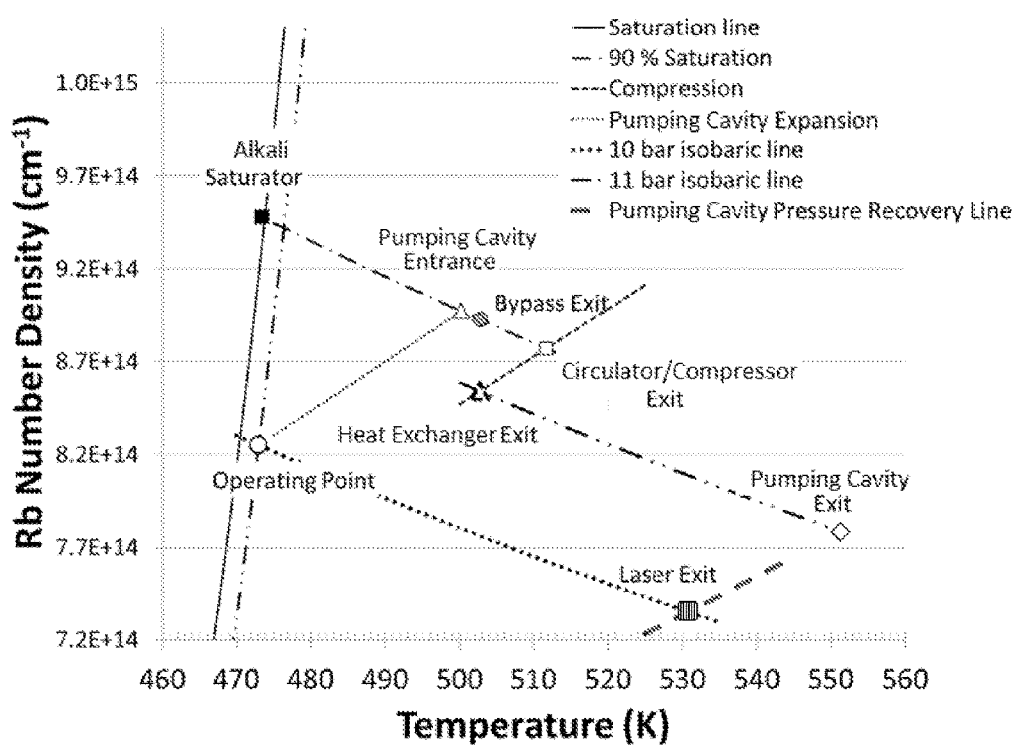
FIG. 3 is a state diagram for a system utilizing a rubidium (Rb)-based lasing gas volumetric flow, in accordance with an embodiment of the present invention.

FIG. 3 is a state diagram for a system 1000 utilizing a rubidium (Rb)-based lasing gas volumetric flow, in accordance with an embodiment of the present invention. As can be seen from the depicted example embodiment, system 1000 can have an operating point, for instance, at about 10 atm and 150° C. As will be appreciated in light of this disclosure, and in accordance with an embodiment, the 100% saturated fixed point on the state diagram may effectively anchor the entire loop of the diagram. In a system 1000 having only one source of Rb (e.g., in saturating element 412), if the temperature of the volumetric flow of gas that is exposed to the Rb (e.g., Volumetric Flow A) is controllably maintained at the desired saturation temperature, then the alkali vapor concentration throughout the entire loop can be established, regardless of the fraction of gas flow in contact with the liquid alkali metal (i.e., regardless of the amount of lasing gas flow diverted as Volumetric Flow A). The temperature of the lasing gas volumetric flow (after recombining Volumetric Flows A and B) may be at a value somewhere in between the respective temperatures associated with the individual constituent Volumetric Flows A and B (e.g., in proportion to their volume fractions).

The state diagram of FIG. 3 may facilitate understanding the operation of one or more of the various components/elements of an example system 1000 under the several phases of operation of an alkali vapor laser 100 associated therewith. For instance, during steady-state operation, the alkali vapor laser 100 may be either energized or not energized, altering the temperature at the exit of the laser 100 and/or at the exit of its optical pumping cavity 110. The exit temperature of heat exchanger 220 may reduce this temperature variation, for example, by a factor in the range of about 30× to 200×. This variation can be further reduced, however, by a similar factor after passing through the alkali vapor concentration management sub-system 400. Upon exiting such sub-system 400, the combination of the two volumetric flows (e.g., Volumetric Flows A and B) may provide a stable temperature and/or alkali vapor (e.g., Rb) concentration. The percent saturation associated with such concentration at the entrance of optical pumping cavity 110 may be determined, at least in part, by the difference in the temperatures of the thermal reservoirs 200 and 414. It should be noted, however, that the claimed invention is not so limited to the example configuration here described; numerous configurations will be apparent in light of this disclosure.

Non-Alkali Gas Circulation

In some cases, it may be desirable to provide a system 1000 capable of circulating one or more volumetric flows of non-alkali gas (e.g., a gas or gas mixture which is completely or otherwise substantially free of alkali vapor) in addition to circulating a lasing gas volumetric flow. Thus, and in accordance with an embodiment, system 1000 may be configured to circulate a non-alkali gas flow, for example, along a circulation loop 20 and/or a circulation loop 30.

In some instances, system 1000 may be configured such that no alkali vapor from the lasing gas volumetric flow is introduced into the non-alkali gas volumetric flow during circulation thereof along circulation loop 20, and thus the non-alkali gas volumetric flow remains substantially clean and devoid of alkali vapor. However, as will be appreciated in light of this disclosure, in some instances during operation of system 1000, some alkali vapor from the lasing gas flow may mix into the non-alkali gas flowing through optical pumping cavity 110 (e.g., as a result of turbulence within optical pumping cavity 110 due to expanding gases during operation of alkali vapor laser system 100). Furthermore, in some instances, unwanted substances (e.g., particles, ions, vapors, etc.) may be produced during operation of alkali vapor laser system 100 and may make their way into the non-alkali gas flowing through optical pumping cavity 110.

Thus, and in accordance with an embodiment, it may be desirable to pass the non-alkali gas flow of circulation loop 20 through a trap and/or filtration component 500. In accordance with an embodiment, the resultant substantially clean, non-alkali gas flow exiting trap and/or filtration component 500 can be utilized downstream along circulation loop 20 (e.g., in optical pumping cavity 110 of alkali vapor laser system 100).

In some embodiments, the outlet of circulator/compressor 300 may have a sufficiently high pressure to permit a small amount of the lasing gas volumetric flow which otherwise would be circulated in circulation loop 10 to be diverted instead into circulation loop 20 (e.g., optionally bled off as Volumetric Flow C at branching point 302). As can be seen from FIG. 1, optional Volumetric Flow C can be passed through a trap and/or filtration component 500 that is downstream of circulator/compressor 300 and downstream of optical pumping cavity 110. Trap and/or filtration component 500 may be configured, in accordance with an embodiment, to clean and/or deplete Volumetric Flow C of alkali vapor and combine it with the non-alkali gas volumetric flow circulating along circulation loop 20 for downstream use. As will be appreciated in light of this disclosure, optionally bleeding off Volumetric Flow C from the lasing gas flow may result in a substantially equivalent volume of the non-alkali gas volume being returned to the lasing gas flow downstream (e.g., mixing into the lasing gas stream in optical pumping cavity 110 to replenish the lasing gas volume).

Trapping of alkali vapor by component 500 can be achieved by any of a wide variety of techniques. For instance, in some cases, the alkali vapor may be depleted from Volumetric Flow C using a condensation or other thermo-cooling process. Volumetric Flow C may be flowed through a heat exchanger (e.g., a water-cooled condenser) which sufficiently cools the gas so as to cause the alkali vapor to condense out of the gas. In some instances, conduction or heat pipes may be placed in contact with a cold reservoir to establish the desired temperature of the alkali vapor condenser. In some instances, a cryogenic cooling process may be utilized. In some other cases, the alkali vapor may be depleted from Volumetric Flow C using a chemical getter process. Volumetric Flow C may be flowed through a bundle of polytetrafluoroethylene (PTFE) tubes, the fluorine (F) in the PTFE material serving as a chemical getter material, and the alkali atoms may be removed by the getter material as Volumetric Flow C is passed through the tubes. Other suitable techniques for depleting Volumetric Flow C of alkali vapor will depend on a given application and will be apparent in light of this disclosure.

Also, and in accordance with an embodiment, trap and/or filtration component 500 may include one or more filters, for example, for filtering out any unwanted substances (e.g., particles, ions, vapors, etc.) which may be produced during operation of alkali vapor laser system 100, thus maintaining the cleanliness of the non-alkali gas volumetric flow circulating along circulation loop 20. The resultant clean, non-alkali gas volumetric flow (derived from Volumetric Flow C) can be delivered to a downstream circulator/compressor 600. In some cases, circulator/compressor 600 may be dedicated, in accordance with an embodiment, to circulation loop 20 (i.e., may be configured to circulate only the non-alkali gas volumetric flow). Passage of the non-alkali gas volumetric flow through circulator/compressor 600 may raise the pressure of such volume, for example, for subsequent acceleration through optical pumping cavity 110. As will be appreciated in light of this disclosure, and in accordance with an embodiment, the velocity of the non-alkali gas flow can be altered, for example, by adjusting the impeller speed of circulator/compressor 600. In some cases, circulator/compressor 600 may be configured in much the same way as circulator/compressor 300, discussed above (e.g., a low-pressure, high-flow centrifugal impeller turbine compressor). Other suitable types and/or configurations for circulator/compressor 300 will depend on a given application and will be apparent in light of this disclosure.

As will be appreciated in light of this disclosure, adjustment of the compressor speed of circulator/compressor 600, for example, as compared with the compressor speed of circulator/compressor 300 may produce changes in the velocity ratio and/or pressure ratio between the flow of the lasing gas volume and the flow of the non-alkali gas volume. As will be further appreciated, and in accordance with an embodiment, the velocity of the non-alkali gas flow can be altered, for example, by adjusting the impeller speed of circulator/compressor 600.

During its passage through circulator/compressor 600, the non-alkali gas volumetric flow may undergo adiabatic compression, which may result in an increase in temperature of the non-alkali gas volumetric flow in the range of about 1-15° C. (e.g., about 5-10° C.). However, as will be appreciated in light of this disclosure, the actual temperature rise of the non-alkali gas volumetric flow as it passes through circulator/compressor 600 can be, in some cases: (1) greater due to heat generated by turbine inefficiencies, friction, etc.; and/or (2) lower if heat is lost to the environment surrounding system 1000.

In some cases, it may be desirable to regulate the pressure and/or velocity of the non-alkali gas flow as it enters circulator/compressor 600 (e.g., to help reduce the demands on circulator/compressor 600). To that end, and in accordance with an embodiment, a flow controller 599 optionally may be implemented upstream of circulator/compressor 600.

In accordance with an embodiment, after passing through circulator/compressor 600, the non-alkali gas volumetric flow may be passed through a heat exchanger 700 located upstream of optical pumping cavity 110. Heat exchanger 700 may be configured to aid in the removal of excess heat deposited into the non-alkali gas flow, for example, by compression processes at circulator/compressor 600. In some embodiments, heat exchanger 700 may be configured as a liquid-to-liquid heat exchanger (i.e., a cooler) capable of handling about 1-100 kW of cooling (or greater). In some instances, heat exchanger 700 may utilize low-viscosity silicone oil as a heat transfer fluid. Furthermore, in some cases, heat exchanger 700 may be operated at a relatively low temperature (e.g., in the range of about 20-40° C.). In some embodiments, system 1000 also optionally may include a heat exchanger 800, for example, downstream of optical pumping cavity 110 and upstream of trap and/or filtration component 500 to aid in removing heat deposited into the non-alkali gas flow during its transit through optical pumping cavity 110. In accordance with an embodiment, heat exchanger 800 may be configured in much the same way as heat exchanger 700, discussed herein. Other suitable types, configurations, and/or temperature ranges for heat exchangers 700 and/or 800 will depend on a given application and will be apparent in light of this disclosure.

Also, as can be seen from FIG. 1, system 1000 optionally can be configured to provide a bleed flow channel 303 that diverts away from circulation loop 10 a fraction of the total available lasing gas volumetric flow and prepares that bleed flow volume for downstream use along an optional circulation loop 30. As previously noted, the proportionality of the bleed flow volume as compared to the lasing gas volumetric flow can be customized for a given target application or end-use. In some embodiments, optional circulation loop 30 may connect the output end of circulator/compressor 300 with a downstream trap and/or filtration component 900 and one or more downstream output windows 120 within alkali vapor laser system 100.

When initially diverted from the lasing gas flow, the bleed flow volume may contain alkali vapor and/or one or more unwanted substances (e.g., particles, ions, vapors, etc.), which it may be desirable to remove or otherwise reduce before delivery to alkali vapor laser system 100. To that end, the bleed flow volume may be passed through a trap and/or filtration component 900. Trap and/or filtration component 900 can be configured similarly, for example, to trap and/or filtration component 500, discussed above. In particular, trap and/or filtration component 900 may be configured, in some embodiments, to clean and/or deplete the bleed flow 303 of alkali vapor and/or unwanted substances (e.g., particles, ions, vapors, etc.) and to provide the resultant substantially clean, non-alkali gas flow for downstream circulation along circulation loop 30. Trapping of alkali vapor by component 900 can be achieved using any of the various example techniques previously discussed with reference to component 500 (e.g., cryogenic condensation process; chemical bonding; etc.). As will be appreciated in light of this disclosure, it may be desirable in some cases to regulate the pressure and/or velocity of the lasing gas flow downstream of circulator/compressor 300. To that end, a flow controller 399 optionally may be implemented along flow channel 303 downstream of circulator/compressor 300.

After passing through trap and/or filtration component 900, the bleed flow gas volume may be substantially clean and devoid of alkali vapor and other contaminants. Thereafter, the clean, non-alkali gas volumetric flow can be delivered downstream along circulation loop 30 to alkali vapor laser system 100, where it may be used, for example, to purge the one or more output windows 120 of alkali vapor laser system 100. Within alkali vapor laser system 100, the bleed flow volume can be squirted or otherwise flowed along the one or more output windows 120, in accordance with some embodiments.

While being flowed along a given output window 120, some alkali vapor from the lasing gas volumetric flow passing through optical pumping cavity 110 may mix into the clean, non-alkali gas (e.g., as a result of turbulence due to expanding gases during operation of alkali vapor laser system 100). Furthermore, in some instances, unwanted substances (e.g., particles, ions, vapors, etc.) may be produced during operation of alkali vapor laser system 100 and may make their way into the non-alkali gas flowing along a given output window 120. Thus, after flowing along the one or more output windows 120 of alkali vapor laser system 100, the resultant gas volume containing alkali vapor and/or one or more contaminants may be permitted to recombine with the gas volume flowing around circulation loop 20 at a recombination point 102 (e.g., downstream of optical pumping cavity 110). In some cases, the resultant gas volume may be permitted to recombine with the lasing gas flowing around circulation loop 10 at a recombination point 104 (e.g., downstream of optical pumping cavity 110). As will be appreciated in light of this disclosure, bleeding off a portion of the lasing gas volumetric flow along bleed flow channel 303 may cause a substantially equivalent amount of the non-alkali gas volumetric flow circulating along circulation loop 20 to be returned to the lasing gas flow downstream (e.g., mixing into the lasing gas stream in optical pumping cavity 110 along circulation loop 10 to replenish the lasing gas volume). In some instances, and in accordance with some embodiments, this mass transfer may help to prevent or otherwise reduce migration of alkali vapor and/or unwanted substances (e.g., particles, ions, vapors, etc.) from the lasing gas flow along circulation loop 10 to the non-alkali gas flow along circulation loop 20 within optical pumping cavity 110 of alkali vapor laser system 100. Also, in some instances, and in accordance with some embodiments, this mass transfer may help to direct any alkali vapor and/or unwanted substances (e.g., particles, ions, vapors, etc.) picked up by the gas flow along circulation loop 30 into the lasing gas flow along circulation loop 10 within alkali vapor laser system 100.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system comprising:
   an alkali vapor laser system including an optical pumping cavity; and
   a first circulation loop configured to circulate a lasing gas volumetric flow for use in the alkali vapor laser system, the first circulation loop comprising:
      a first heat exchanger thermally coupled with a first thermal reservoir;
      a first circulator fluidly coupled with the first heat exchanger; and
      an alkali vapor concentration management sub-system fluidly coupled with the first circulator and with the optical pumping cavity,
   wherein the alkali vapor concentration management sub-system comprises:
      a first flow path configured to receive a first volumetric sub-flow of the lasing gas volumetric flow and, during transit of the first volumetric sub-flow therethrough, establish a first temperature of that first volumetric sub-flow and an alkali vapor concentration in the first volumetric sub-flow at an alkali saturation density corresponding to the first temperature; and
      a second flow path configured to receive a second volumetric sub-flow of the lasing gas volumetric flow and, during transit of the second volumetric sub-flow therethrough, maintain the second volumetric sub-flow at a second temperature that is higher than the first temperature, and
   wherein the first flow path comprises an alkali vapor saturator comprising a saturating element having a quantity of liquid alkali metal disposed therein, the saturating element being thermally coupled with a second thermal reservoir.

2. The system of claim 1, wherein the second flow path comprises a second heat exchanger.

3. The system of claim 1, wherein the saturating element comprises a plurality of indentations or corrugations.

4. The system of claim 3, wherein the quantity of liquid alkali metal is distributed discontinuously in the plurality of indentations or corrugations of the saturating element.

5. The system of claim 1, wherein the quantity of liquid alkali metal is distributed as a plurality of droplets within the saturating element.

6. The system of claim 1, wherein the quantity of liquid alkali metal at least partially wets an interior surface of the saturating element.

7. The system of claim 1, wherein the saturating element comprises a helical, tubular coil comprising at least one of stainless steel and glass.

8. The system of claim 1, wherein the liquid alkali metal comprises at least one of rubidium (Rb), cesium (Cs), and potassium (K).

9. The system of claim 1, wherein the alkali vapor saturator is decoupled from an operational phase of the alkali vapor laser system, the operational phase comprising at least one of system warm-up, a non-lasing ready state, lasing operation, and system cool-down.

10. The system of claim 1, wherein the first circulation loop further comprises a recombination point at which the first volumetric sub-flow and the second volumetric sub-flow are recombined.

11. A system comprising:
an alkali vapor laser system including an optical pumping cavity;
a first circulation loop configured to circulate a lasing gas volumetric flow for use in the alkali vapor laser system, the first circulation loop comprising:
a first heat exchanger thermally coupled with a first thermal reservoir;
a first circulator fluidly coupled with the first heat exchanger; and
an alkali vapor concentration management sub-system fluidly coupled with the first circulator and with the optical pumping cavity, the alkali vapor concentration management sub-system comprising:
a first flow path configured to receive a first volumetric sub-flow of the lasing gas volumetric flow and, during transit of the first volumetric sub-flow therethrough, establish a first temperature of that first volumetric sub-flow and an alkali vapor concentration in the first volumetric sub-flow at an alkali saturation density corresponding to the first temperature; and
a second flow path configured to receive a second volumetric sub-flow of the lasing gas volumetric flow and, during transit of the second volumetric sub-flow therethrough, maintain the second volumetric sub-flow at a second temperature that is higher than the first temperature; and
a second circulation loop configured to circulate a non-alkali gas volumetric flow for use in the alkali vapor laser system, the second circulation loop comprising:
a trap or filtration component fluidly coupled with the optical pumping cavity and with the first circulator;
a second circulator fluidly coupled with the trap or filtration component; and
a third heat exchanger fluidly coupled with the second circulator and with the optical pumping cavity.

12. The system of claim 11, wherein the second circulation loop further comprises a fourth heat exchanger fluidly coupled with the optical pumping cavity and with the trap or filtration component.

13. The system of claim 1, wherein the alkali vapor laser system comprises a diode-pumped alkali laser (DPAL).

14. A method of adjusting alkali vapor concentration in a lasing gas, the method comprising:
circulating a lasing gas volumetric flow in a first circulation loop comprising a first heat exchanger thermally coupled with a first thermal reservoir;
dividing the lasing gas volumetric flow into a plurality of volumetric sub-flows, the plurality including at least a first volumetric sub-flow and a second volumetric sub-flow;
receiving the first volumetric sub-flow along a first flow path comprising an alkali vapor saturator comprising a saturating element having a quantity of liquid alkali metal disposed therein, the saturating element being thermally coupled with a second thermal reservoir;
establishing a first temperature of the first volumetric sub-flow and an alkali vapor concentration in the first volumetric sub-flow at an alkali saturation density corresponding to the first temperature;
maintaining the second volumetric sub-flow at a second temperature that is higher than the first temperature; and
recombining the first volumetric sub-flow and the second volumetric sub-flow.

15. The method of claim 14, wherein before recombining the first volumetric sub-flow and the second volumetric sub-flow, the method further comprises:
bringing the second volumetric sub-flow to the second temperature in the range of about 5-30° C. higher than the first temperature.

16. The method of claim 14, wherein the establishing of the alkali vapor concentration in the first volumetric sub-flow comprises exposing the first volumetric sub-flow to the quantity of liquid alkali metal comprising at least one of rubidium (Rb), cesium (Cs), and potassium (K).

17. The method of claim 14, wherein before recombining the first volumetric sub-flow and the second volumetric sub-flow, the method further comprises:
maintaining the second volumetric sub-flow at the second temperature that is higher than a condensation temperature of the first volumetric sub-flow.

18. The method of claim 14, wherein the first volumetric sub-flow comprises less than or equal to about 10% of the lasing gas volumetric flow.

19. The method of claim 14, wherein the first volumetric sub-flow comprises about 2% of the lasing gas volumetric flow and the second volumetric sub-flow comprises about 98% of the lasing gas volumetric flow.

* * * * *